United States Patent
Plant, Jr.

(10) Patent No.: US 7,932,620 B2
(45) Date of Patent: Apr. 26, 2011

(54) WINDMILL UTILIZING A FLUID DRIVEN PUMP

(76) Inventor: William R. Plant, Jr., Bennett, CO (US)

( * ) Notice: Subject to any disclaimer, the term of this patent is extended or adjusted under 35 U.S.C. 154(b) by 539 days.

(21) Appl. No.: 12/113,217

(22) Filed: May 1, 2008

(65) Prior Publication Data

US 2009/0273186 A1  Nov. 5, 2009

(51) Int. Cl.
*F03B 9/00* (2006.01)
*H02P 9/04* (2006.01)

(52) U.S. Cl. ................ 290/55; 290/44; 60/398

(58) Field of Classification Search ........... 290/43, 290/44, 54, 55; 60/398
See application file for complete search history.

(56) References Cited

U.S. PATENT DOCUMENTS

| | | | |
|---|---|---|---|
| 4,206,608 A | 6/1980 | Bell | |
| 4,274,010 A | 6/1981 | Lawson-Tancred | |
| 4,368,692 A | 1/1983 | Kita | |
| 4,441,872 A * | 4/1984 | Seale | 417/282 |
| 4,496,846 A | 1/1985 | Parkins | |
| 4,496,847 A | 1/1985 | Parkins | |
| 4,498,017 A | 2/1985 | Parkins | |
| 4,792,700 A | 12/1988 | Ammons | |
| 4,815,936 A * | 3/1989 | Stoltze et al. | 416/9 |
| 5,495,128 A | 2/1996 | Brammeier | |
| 6,911,743 B2 | 6/2005 | Ishizaki | |
| 7,183,664 B2 * | 2/2007 | McClintic | 290/55 |
| 7,436,086 B2 * | 10/2008 | McClintic | 290/55 |
| 7,485,979 B1 * | 2/2009 | Staalesen | 290/44 |
| 2006/0210406 A1 | 9/2006 | Harvey et al. | |
| 2007/0024058 A1 | 2/2007 | McClintic | |
| 2007/0138798 A1 | 6/2007 | McClintic | |
| 2009/0273191 A1 * | 11/2009 | Plant, Jr. | 290/4 C |

FOREIGN PATENT DOCUMENTS

| | | |
|---|---|---|
| DE | 19530253 | 11/1996 |
| DE | 102006032388 | 1/2008 |
| EP | 1677002 | 5/2006 |
| WO | WO9419605 | 9/1994 |
| WO | WO03/098037 | 11/2003 |
| WO | WO2007/016120 | 8/2007 |

* cited by examiner

*Primary Examiner* — Nicholas Ponomarenko
(74) *Attorney, Agent, or Firm* — Christopher Wood; Daniel Eisenberg; Premier Law Group, PLLC

(57) ABSTRACT

A windmill apparatus includes tower, a tower-mounted hydraulic pump driven by windmill blades, and hydraulic lines connected to a ground storage tank and to a number of separate generator units. Each generator unit includes a hydraulic pump and an electrical generator. In operation, upon startup, as the wind propels the propeller-driven pump the hydraulic fluid circulates freely until a pre-set pressure is achieved, upon which a diverter valve diverts all the fluid pressure to the first generator unit. When the first generator unit is powered sufficiently to achieve a stable output voltage, a subsequent one of the remaining generator units is powered up until its output voltage is stabilized, with this process continuing as long as there is a surplus of hydraulic power available to power up additional units to take full advantage of all of the available wind power.

12 Claims, 5 Drawing Sheets

WINDMILL UTILIZING A FLUID DRIVEN PUMP

CROSS REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates generally to an apparatus for producing electrical power from wind energy. More particularly, this invention is directed to an apparatus for producing electrical power from wind energy using a plurality of generator sets arranged in stages.

BACKGROUND OF THE INVENTION

In U.S. Pat. No. 7,183,664 to McClintic, an advanced wind turbine design is shown which includes a wind powered rotary blade arrangement which powers a hydraulic pump. The pump pressurizes a hydraulic fluid which powers a hydraulic motor on the ground. The hydraulic motor powers an electrical generator, producing power.

U.S. Pat. No. 4,496,847 to Parkins shows a power generator using wind energy, including a pump, a turbine, and an electric generator. Additional turbines are possible according to this patent.

There is a need for an apparatus for efficiently using wind energy, for a range of wind speed and conditions. There is a need for an apparatus using minimal structural materials for a wind powered apparatus, and for producing electricity when any of a plurality of electrical generators is disabled or cannot be used.

It is accordingly a problem in the prior art to provide an apparatus for more efficiently utilizing wind energy, and which can be incrementally expanded in power output capacity.

SUMMARY OF THE INVENTION

From the foregoing, it is seen that it is a problem in the art to provide a device meeting the above requirements.

According to the present invention, a device is provided which meets the aforementioned requirements and needs in the prior art. Specifically, the device according to the present invention provides an apparatus for efficiently using wind energy, for a range of wind speed and conditions, and uses minimal structural materials for a wind powered apparatus. Also, the apparatus can produce electricity when any of a plurality of electrical generators is disabled or cannot be used, and can be incrementally expanded in power output capacity.

The device according to the present invention includes a windmill which turns a mechanical transmission to power a hydraulic pump mounted in the windmill tower. The pump actuates a hydraulic motor located on the ground, and the motor powers an electrical generator to produce electrical power.

Other objects and advantages of the present invention will be more readily apparent from the following detailed description when read in conjunction with the accompanying drawings.

DETAILED DESCRIPTION OF THE INVENTION

Figure 1:
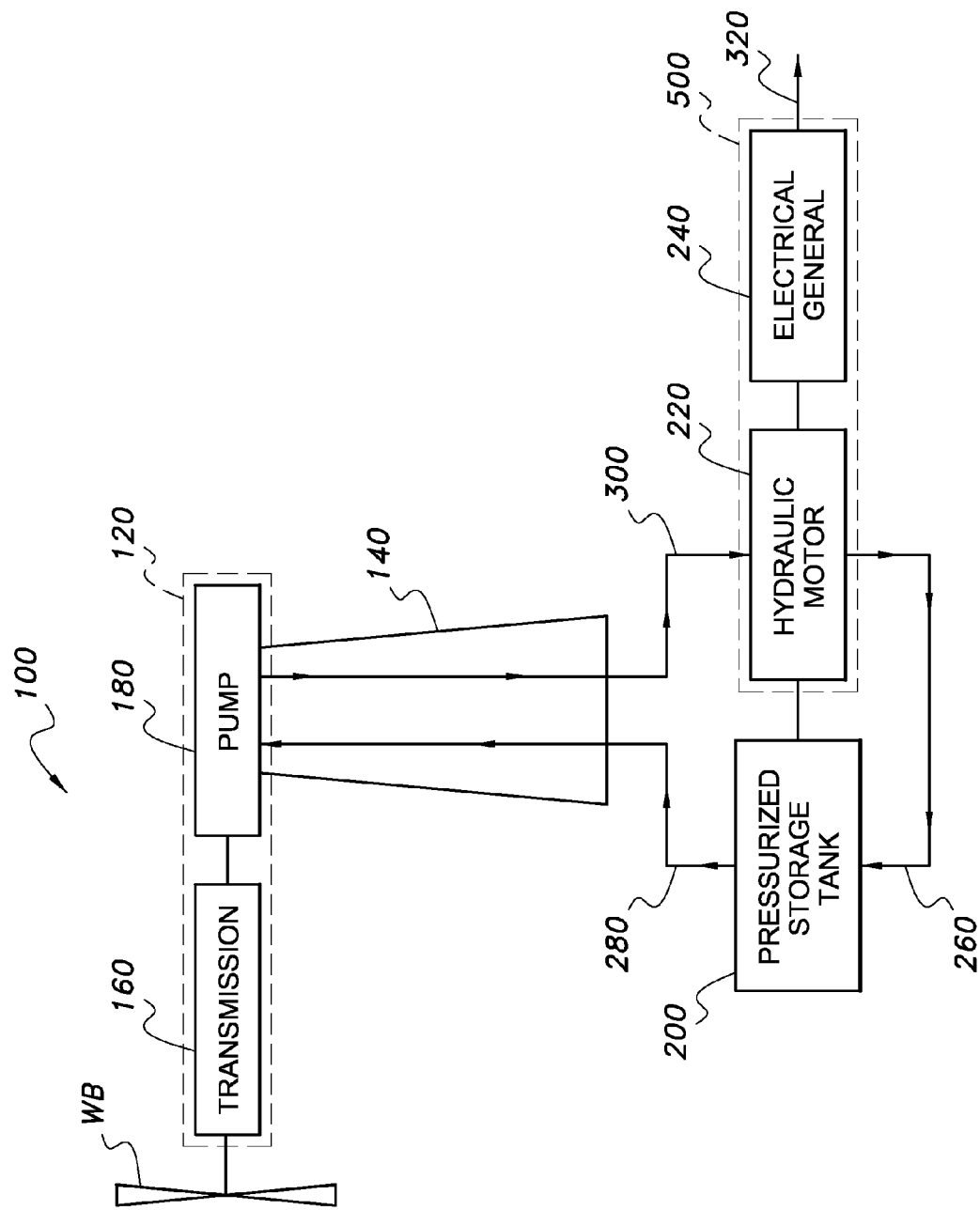
FIG. 1 is schematic side view of a windmill utilizing a fluid driven pump, according to the present invention.

FIG. 1 is schematic side view of a windmill 100 utilizing a hydraulic pump 180, the windmill including a blade or plurality of blades WB, a housing 120, and a support tower 140. The windmill blades WB are driven by air flow to rotate, which in turn drives a mechanical transmission mechanism 160. The transmission 160 is connected to drive the pump 180, producing high pressure output fluid via a high pressure oil line 300, to a hydraulic motor 220.

Figure 2:
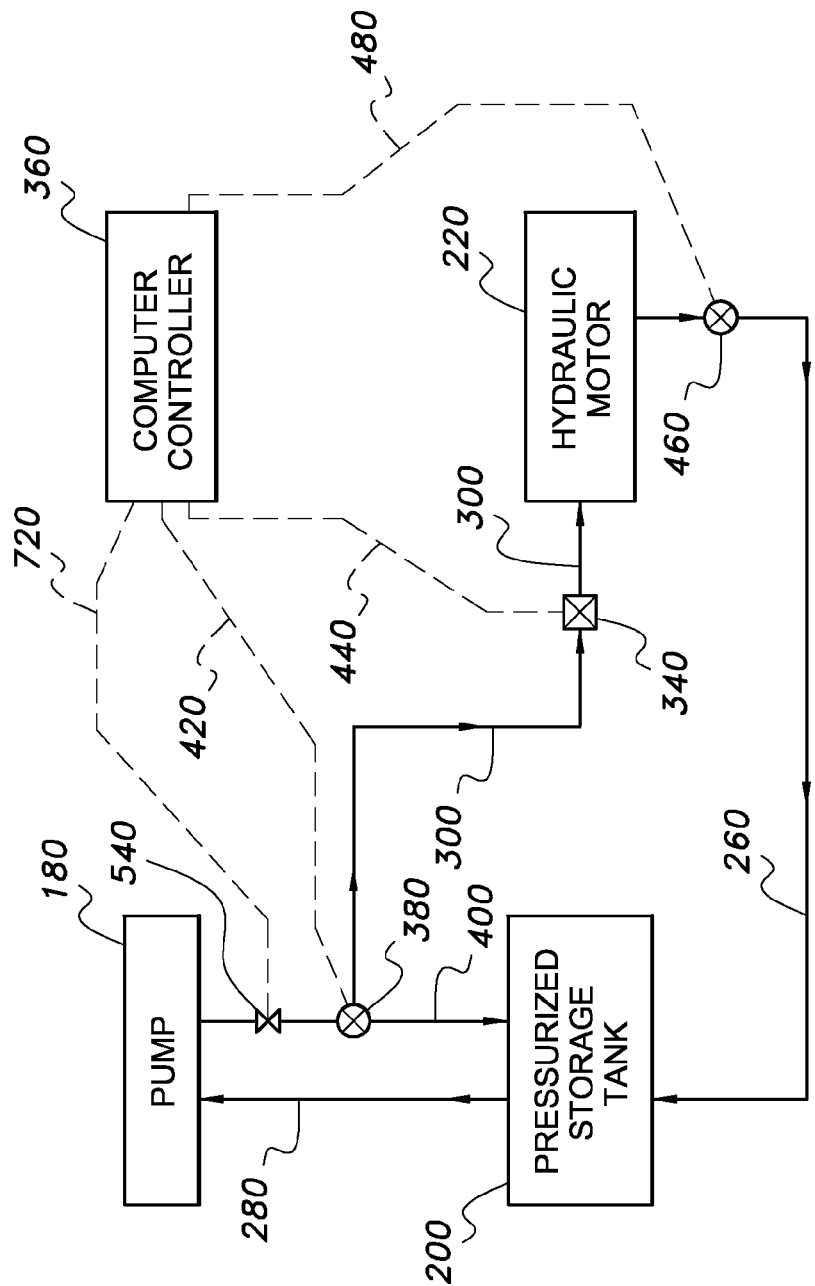
FIG. 2 is a schematic view of the hydraulic arrangement for use in the windmill of FIG. 1.
Figure 3:
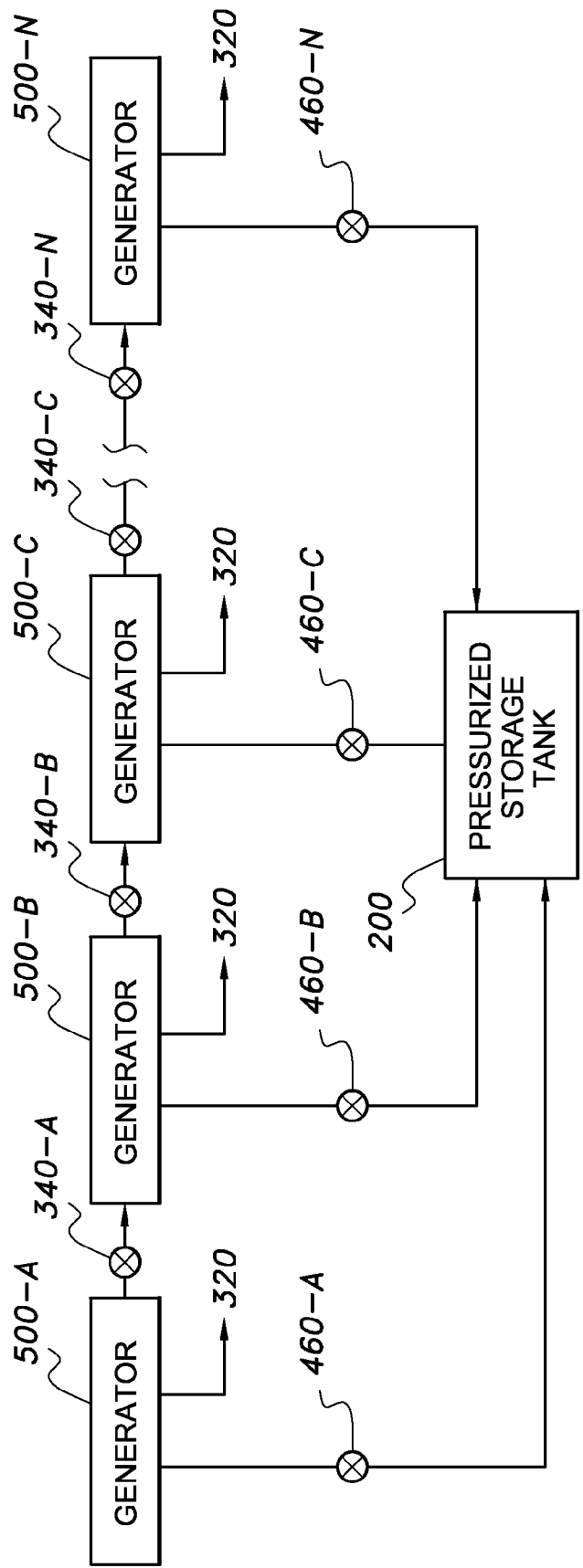
FIG. 3 is a schematic view of a multi-stage generator unit arrangement, for use with the windmill of FIG. 1.

In FIG. 1, only a single generator unit 500 is shown, but as depicted in FIG. 3 in the preferred embodiment there are a plurality of such units. In operation, upon startup, as the wind propels the propeller-driven pump 180 the hydraulic fluid circulates freely until a pre-set pressure is achieved, upon which a pressure switch (for example, pressure sensor 540 as shown in FIG. 2) triggers a controller to actuate a valve or valves to divert all the fluid pressure to the first generator unit 500. The first such generator unit 500 is powered such that it speeds up until a selected speed is achieved sufficient to stabilize output voltage.

After the first such generator unit 500 is powered up and a stable output voltage is achieved, a subsequent one of the remaining generator units is powered up until its output voltage is stabilized, with this process continuing as long as there is a surplus of hydraulic power available to power up additional units. By way of example, for a relatively low wind speed, there may only be sufficient hydraulic power to fully operate a single such generator unit 500. At higher wind speeds, it might be possible to operate 2, 3, 5, 10, 20, or more such generator units. In this manner, it is possible to extract a significantly greater amount of power from the wind at a given wind speed, as compared with the prior art, by a factor of three times to five times more power. Furthermore, this renders the entire power plant expandable by unit increments, since additional generator units can be installed or added at any time, to take full advantage of all of the available wind power. This results in more electrical output per unit area as compared with the prior art, enabling a smaller footprint for applications with small usable available areas, and enabling greater power output for a given available area. Additionally, a plurality of windmills can be incrementally added to bolster hydraulic power available to a given series of generator units.

Except for the pump 180 mounted on the support tower 140, all other hydraulic and electrical generating equipment is located on the ground for simplicity of maintenance, replacement, etc. Should a generator unit 500 malfunction or need replacement, the fluid is bypassed and the windmill continues to produce electricity above and beyond the traditional wind powered generators currently in use. The controller (for example, the controller 360 of FIG. 2) preferably sets performance and monitors all fluid pressures and any other sensed conditions which may include such items as power output, fluid and air temperatures, speeds of the hydraulic motors and electrical generators, and electrical output production of the windmill 100.

The hydraulic motor 220 has a rotary output shaft which drives an electrical generator 240, which in turn produces electrical output power indicated by the arrow 320. The hydraulic motor 220 discharges oil via a discharge line 260 to a pressurized storage tank 200. The hydraulic motor 220 and the electrical generator 240 are taken together as a generator unit 500, as indicated by the dashed outline in FIG. 1.

The pump 180 takes in fluid, which is preferably an environmentally safe fluid, from the pressurized storage tank 200 via an oil supply line 280.

FIG. 2 is a schematic view of the hydraulic arrangement for use in the windmill 100. In this arrangement, a valve 380 is interposed between the pump 180 and the pressurized storage tank 200 along a discharge line 400, and the valve 380 is also connected to the hydraulic motor 220 along a high pressure line 300. The valve 380 is in communication with a controller 360 as indicated by the dashed line 420, and is directed by the controller 360 to selectively supply high pressure fluid either along the line 400 to the storage tank 200 or along the line 300 to the hydraulic motor 220.

A pressure sensor 540 is disposed to measure pressure in the high pressure discharge line 400 and is located between the pump 180 and the valve 380. The pressure sensor 540 supplies an output signal communicating with the controller 360 as indicated by the dashed line 720, thereby indicating the sensed pressure to the controller 360. In operation, when the sensed pressure reaches a predetermined magnitude which is sufficient for operation, the valve 380 is controlled by the controller 360 to supply high pressure fluid to the line 300.

The valve 340 is shown along the line 300, and can be controlled by the controller 360 as indicated by the dashed line 440 to open or close so as to isolate the hydraulic motor 220 in case of malfunction, maintenance, or replacement. Other valves and sensors can additionally be used for various routing of hydraulic fluid to bypass the hydraulic motor, and such bypass conduit arrangements are well known in the pumping arts. All such variations are contemplated as being within the scope of the present invention.

In the present invention, the controller 360 is indicated as being a computer controller. Such computer controllers are well known in the power plant control arts; further, analog control equipment can also be used, which are also known in the power plant control arts. The communication of various elements with the controller 360 can be wireless communication which is well known in the control arts, or can be a hardwired connection, or any combination of the two. The hydraulic lines can be any type suitable for use with the pressures required for operation of the hydraulic motor 220. All such variations are contemplated as being within the scope of the present invention.

A pressurized storage tank, hydraulic motors, and other hardware elements usable in the present invention can be of the type shown in the above-mentioned U.S. Pat. No. 7,183,664 issued to McClintic on Feb. 27, 2007, the disclosure of which is hereby expressly incorporated herein in its entirety by reference thereto.

FIG. 3 is a schematic view of a multi-stage generator unit arrangement, for use with the windmill 100 of FIG. 1. In this arrangement, generator units 500-A, 500-B, 500-C, . . . , 500-N are connected in series, wherein each generator unit corresponds to the generator unit 500 of FIG. 1, which includes a hydraulic motor 220 and an electrical generator 240 so as to convert hydraulic power into electrical power.

In the arrangement of FIG. 3, valves 340-A, 340-B, 340-C, . . . , 340-N are provided to schematically indicate communication of hydraulic fluid along the series path of the generators. Electrical output power from each generator is indicated by the arrows 320. Return lines having valves 460-A, 460-B, 460-C, . . . , 460-N are provided for return of hydraulic fluid from each of the generator units to the pressurized storage tank 200. The controller 360 would control operation of these valves. For example, where only the first two generators are used to produce power, it would be preferred to close all of the valves 460 except valve 460-B, so that fluid is forced to pass only through the first two generators in the series. As more hydraulic power becomes available, the controller 360 controls the various valves to place more generators in operation in this manner.

Other valve arrangements can also be used, or a header can be provided to supply all of the generator units with hydraulic fluid in parallel although with valve arrangements controlled by the controller 360 such that the hydraulic fluid is supplied to any selected one or ones of the generator units. In this valve arrangement, the series connection is created by the controller and valve arrangement, rather than merely the physical arrangement of the generator units which might or might not be physically connected directly in series. Thus, the effect is the same, that one generator unit is powered up at a time, and additional units are powered up only as sufficient hydraulic power becomes available to operate them at the optimal speed and electrical output level.

Figure 4:
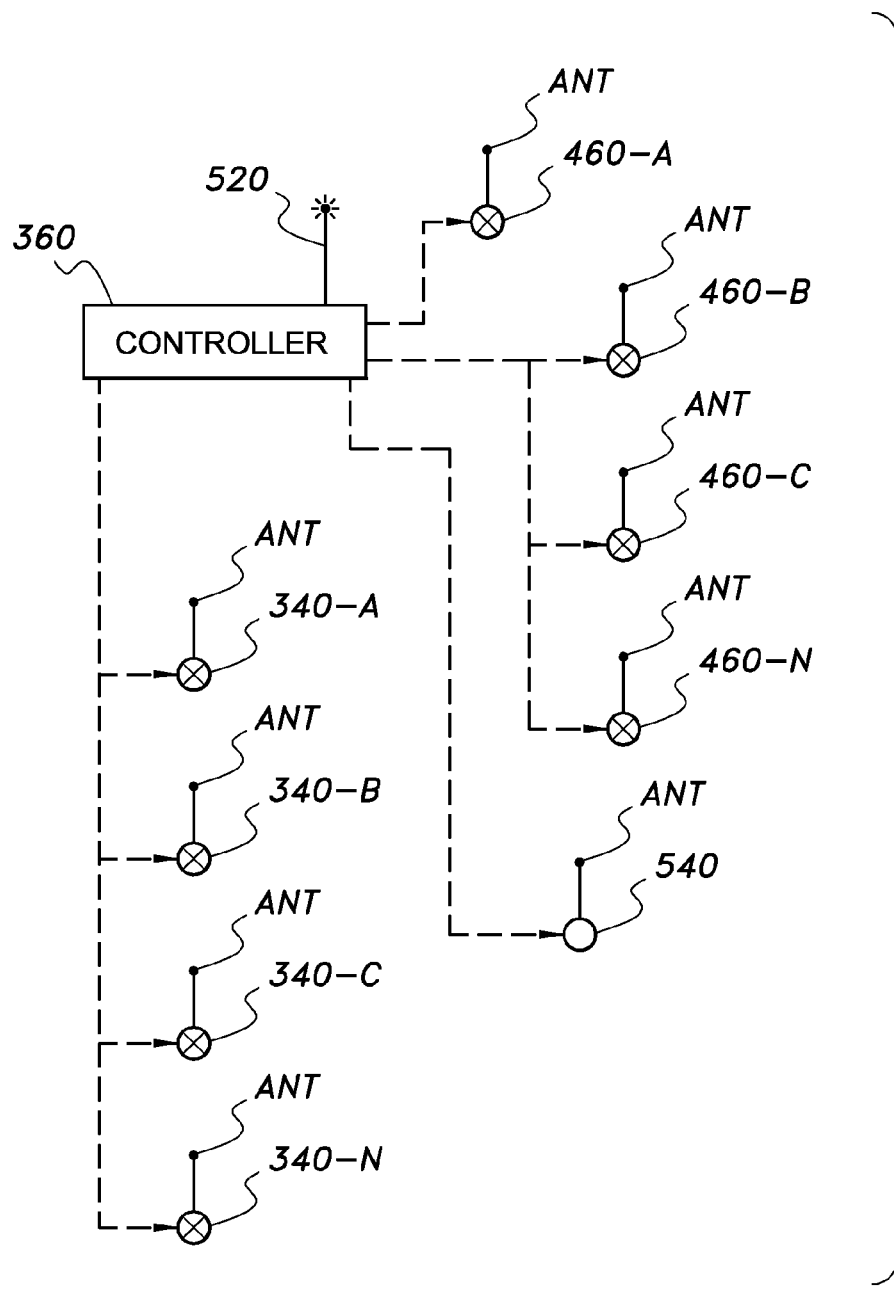
FIG. 4 is a schematic view of wireless communication between a controller and a plurality of valves.

FIG. 4 is a schematic view of wireless communication between the controller 360 and a plurality of valves, in which the valves are each equipped with any known type of wireless antenna ANT. The valves shown include valves 340-A, 340-B, 340-C, . . . , 340-N (where N is an Nth valve in the series), 460-A, 460-B, 460-C, . . . , and 460-N. Furthermore, additional valve arrangements are possible as discussed hereinabove, and wireless transmission could likewise be used with each of those valves as well. Furthermore, the controller 360 is preferably also in communication with pressure sensors (including the pressure sensor 540 of FIG. 2) and any temperature sensors, electrical output sensors, and any other sensors which may be used.

Figure 5:
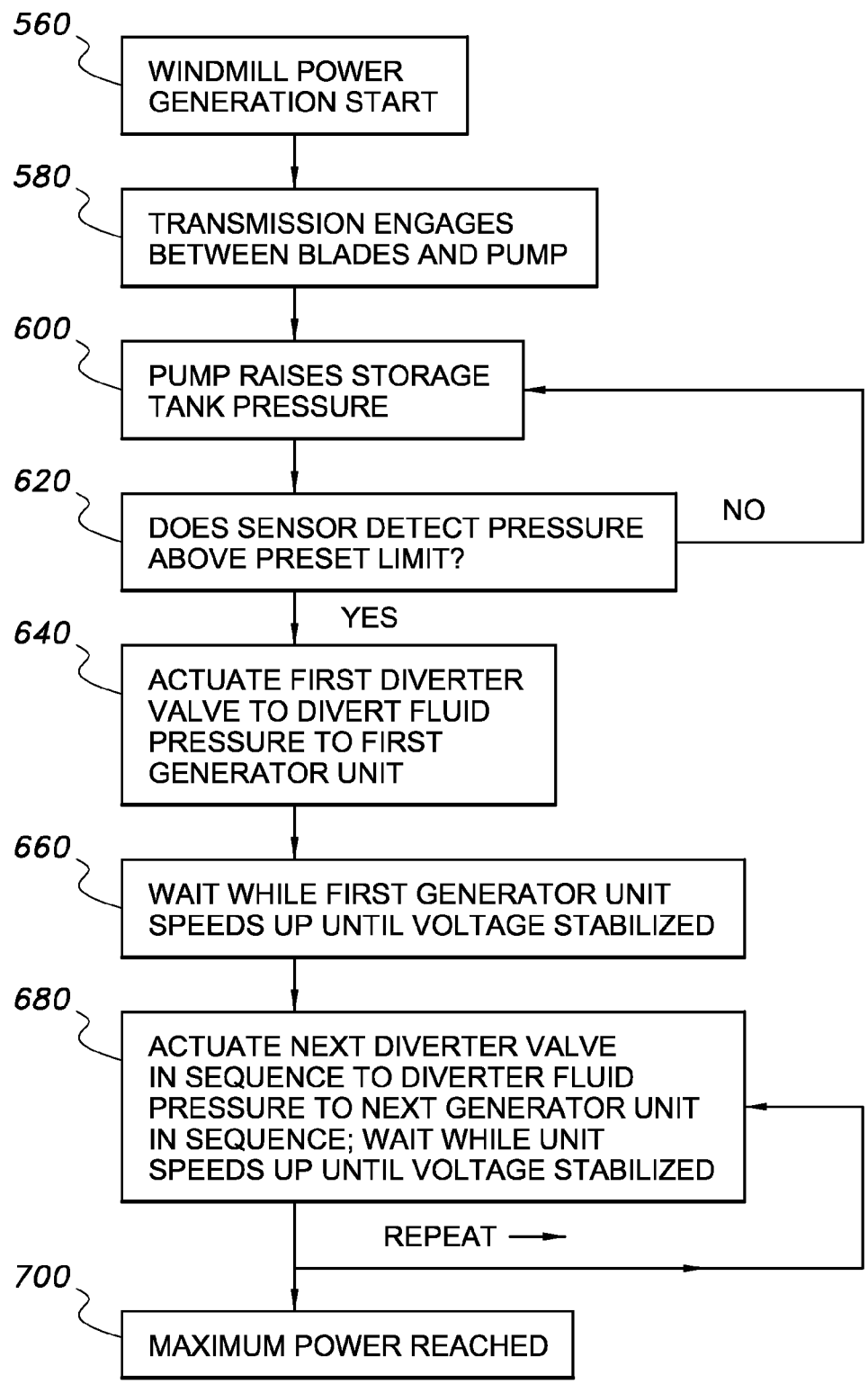
FIG. 5 is a flowchart indicating an operating sequence for the windmill of FIG. 1.

FIG. 5 is a flowchart indicating an operating sequence for the windmill of FIG. 1, which can be implemented in a computer program by any one having skill in the power plant control arts. At step 560, the windmill starts in conjunction with the controller 360 which governs the windmill power generation startup sequence. At step 580, controller 360 governs the engagement of the transmission 160 to control engagement between the windmill blades WB and the pump 180. Following this, at step 600 the pump 180 raises the pressure in the storage tank 200. Following this, at step 620 a test is made whether the sensor 540 detects pressure above a preset limit; if yes, control goes to step 640; if no, return is made to step 600 and the pump 180 continues to raise the pressure. At step 640, control is made to actuate the first diverter valve (valve 380 in FIG. 2) to divert fluid pressure to the first generator unit 500. In the next step 660, the system waits while the first generator unit 500 speeds up until the electrical output voltage is stabilized. Once stabilized, in the following step 680 the controller causes actuation of the next diverter valve in the sequence to divert fluid pressure to the next generator unit in the sequence; and for each such unit the controller waits until the output voltage of that generator unit stabilizes; after which the process repeats as indicated by the arrow labeled REPEAT, until either the maximum number of generator units are in production, or until the next generator unit in the sequence does not have sufficient power (from the hydraulic fluid supplied thereto) to produce a stabilized output voltage, as indicated at step 700.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. An apparatus for producing electrical power from wind energy, comprising:
    a windmill having a tower, a transmission supported by the tower, a hydraulic pump supported by the tower and connected to be driven by the transmission to produce hydraulic pressure in an output line, and at least one windmill blade supported by the tower and connected to drive the transmission;
    a pressurized storage tank connected by a hydraulic line to the hydraulic pump mounted in the tower;
    a plurality of generator units connected to be selectively supplied with hydraulic pressure; each of said plurality of generator units including a hydraulic motor driving an electrical generator, and wherein each respective one of the generator units being selectively coupled hydraulically to the output of the hydraulic pump by respective diverter valves; and
    a controller for causing selective operation of ones of said plurality of generator units in a predetermined sequence by diverting hydraulic pressure to a next one in the predetermined sequence only when a current one of the generator units in the sequence being supplied with hydraulic pressure achieves a stabilized output voltage.

2. An apparatus for producing electrical power from wind energy as claimed in claim 1, further comprising a discharge line connecting each respective hydraulic motor to the pressurized storage tank.

3. An apparatus for producing electrical power from wind energy as claimed in claim 1, further comprising a pressure sensor disposed to sense output pressure of the output line of the hydraulic pump.

4. An apparatus for producing electrical power from wind energy as claimed in claim 3, wherein said pressure sensor communicates with the controller to supply a signal representing the pressure in the output line of the hydraulic pump.

5. An apparatus for producing electrical power from wind energy as claimed in claim 1, wherein said controller includes a wireless communication capacity, and wherein at least one of the diverter valves has a wireless communication capacity and is controlled by wireless communications from said controller.

6. An apparatus for producing electrical power from wind energy as claimed in claim 1, further comprising a hydraulic header supplying said plurality of generator units with hydraulic pressure in parallel, and a plurality of diverter valves disposed between each of said plurality of generator units and said hydraulic header for selectively communicating the hydraulic pressure to selected ones of the plurality of generator units.

7. A process for producing electrical power from wind energy, comprising the steps of:
    providing a windmill having a tower, a transmission supported by the tower, a hydraulic pump supported by the tower and connected to be driven by the transmission to produce hydraulic pressure in an output line, and at least one windmill blade supported by the tower and connected to drive the transmission;
    providing a pressurized storage tank connected by a hydraulic line to the hydraulic pump mounted in the tower;
    providing a plurality of generator units connected to be selectively supplied with hydraulic pressure; each of said plurality of generator units including a hydraulic motor driving an electrical generator, and wherein each respective one of the generator units being selectively coupled hydraulically to the output of the hydraulic pump by respective diverter valves; and
    providing a controller for causing selective operation of ones of said plurality of generator units in a predetermined sequence by diverting hydraulic pressure to a next one in the predetermined sequence only when a current one of the generator units in the sequence being supplied with hydraulic pressure achieves a stabilized output voltage.

8. A process for producing electrical power from wind energy as claimed in claim 7, further comprising the step of providing a discharge line connecting each respective hydraulic motor to the pressurized storage tank.

9. A process for producing electrical power from wind energy as claimed in claim 7, further comprising the step of providing a pressure sensor disposed to sense output pressure of the output line of the hydraulic pump.

10. A process for producing electrical power from wind energy as claimed in claim 9, wherein in said step of providing a pressure sensor, said pressure sensor communicating with the controller to supply a signal representing the pressure in the output line of the hydraulic pump.

11. A process for producing electrical power from wind energy as claimed in claim 7, wherein in said step of providing said controller, providing a wireless communication capacity; and wherein in the step of providing diverter valves, providing at least one of the diverter valves with a wireless communication capacity so that said at least one of the diverter valves is controlled by wireless communications from said controller.

12. A process for producing electrical power from wind energy as claimed in claim 7, further comprising the step of providing a hydraulic header for supplying said plurality of generator units with hydraulic pressure in parallel, and providing a plurality of diverter valves disposed between each of said plurality of generator units and said hydraulic header for selectively communicating the hydraulic pressure to selected ones of the plurality of generator units.

* * * * *